(12) United States Patent
Kaye et al.

(10) Patent No.: US 12,730,963 B2
(45) Date of Patent: Sep. 8, 2026

(54) DYNAMIC-CONTENT SUPPORT SYSTEM IN A NETWORK-BASED APPLICATION

(71) Applicant: Klaviyo, Inc., Boston, MA (US)

(72) Inventors: Matthew Kaye, Cambridge, MA (US); Alex Riina, Cambridge, MA (US); Manuel Ventero Peña, Cambridge, MA (US)

(73) Assignee: Klaviyo, Inc., Boston, MA (US)

( * ) Notice: Subject to any disclaimer, the term of this patent is extended or adjusted under 35 U.S.C. 154(b) by 68 days.

(21) Appl. No.: 18/926,166

(22) Filed: Oct. 24, 2024

(65) Prior Publication Data

US 2026/0119783 A1 Apr. 30, 2026

(51) Int. Cl.
*G06F 40/166* (2020.01)
*G06F 40/279* (2020.01)

(52) U.S. Cl.
CPC .......... *G06F 40/166* (2020.01); *G06F 40/279* (2020.01)

(58) Field of Classification Search
CPC ............................ G06F 40/166; G06F 40/279
See application file for complete search history.

(56) References Cited

U.S. PATENT DOCUMENTS 11,093,951 B1 8/2021 Podgorny et al.
11,409,752 B1 8/2022 Qadrud-Din et al.
11,429,257 B1 8/2022 Nandagopal
11,823,074 B2 11/2023 Doebelin et al.
11,909,699 B1 2/2024 Natoli et al.
12,353,469 B1 * 7/2025 Mahabadi ............. G06F 16/332
2015/0058315 A1 2/2015 Heidasch et al.
2018/0052928 A1 2/2018 Liu et al.
2018/0150551 A1 * 5/2018 Wang .................... G06F 16/338
2020/0110768 A1 4/2020 Bender et al.
2022/0254338 A1 8/2022 Gruber et al.
2023/0245171 A1 8/2023 Niu et al.
2023/0306284 A1 9/2023 Tappin
2023/0376284 A1 11/2023 Shi et al.
(Continued)

FOREIGN PATENT DOCUMENTS

CN 113934837 A * 1/2022 ........... G06F 18/214
CN 117349429 A * 1/2024 ........... G06F 16/345
WO WO-2024205602 A1 * 10/2024 ............ G06N 20/00

OTHER PUBLICATIONS

Using Word Embedding to Enable Semantic Queries in Relational Databases (Year: 2017).*

*Primary Examiner* — Mohammad K Islam
(74) *Attorney, Agent, or Firm* — Batt IP A Law Corporation; Richard Batt

(57) ABSTRACT

A computer-implemented method for automatically providing dynamic content support to a user includes receiving a natural language-based input from a user requesting help. A backend server is operable to pre-process the question prior to searching. A search for the most relevant articles is performed by comparing the pre-processed input to a set of articles in a vector database. The articles can be re-ranked based on content in the question and characteristics of the user. A request or prompt is generated based on the retrieved articles, question, user characteristics, and system rules. A text generation model is operable to prepare a summary based on the prompt. The summary is sent and displayed to the user on their computing device. Related systems are described.

20 Claims, 8 Drawing Sheets

(56) References Cited

U.S. PATENT DOCUMENTS

| | | | |
|---|---|---|---|
| 2024/0054539 | A1 | 2/2024 | Ekfeldt et al. |
| 2024/0232261 | A9 | 7/2024 | Gunasekara et al. |
| 2024/0289554 | A1 | 8/2024 | Galli |
| 2024/0419710 | A1 | 12/2024 | Matson et al. |
| 2025/0117414 | A1 | 4/2025 | McCurdy et al. |
| 2025/0117421 | A1 | 4/2025 | McCurdy et al. |
| 2025/0181899 | A1* | 6/2025 | Ajmera ................ G06N 3/0475 |
| 2026/0057004 | A1* | 2/2026 | Sheikholeslami .... G06F 16/383 |
| 2026/0087244 | A1* | 3/2026 | Jones ................ G06F 16/33295 |

* cited by examiner

DYNAMIC-CONTENT SUPPORT SYSTEM IN A NETWORK-BASED APPLICATION

FIELD OF THE DESCRIBED EMBODIMENTS

The described embodiments relate generally to user support systems in a network-based application, and in particular, to user support systems operable to automatically provide dynamic content support.

BACKGROUND

In network-based applications, users desire to get answers to their questions quickly and without sifting through (often irrelevant) help center documents, community questions, etc.

Users desire to obtain accurate and pertinent answers that resolve the issue without assistance from support personnel. Support personnel typically require the user to wait. Support personnel, even if available, may not be able to quickly or accurately troubleshoot the issue depending on the problem to be solved and the skill of the personnel. Users desire self-serve support.

It is therefore desirable to have computer-implemented methods, apparatuses, and systems for addressing the above-mentioned challenges.

SUMMARY

An embodiment of the invention includes a computer-implemented method for automatically providing dynamic content support to a user.

In embodiments, the method includes indexing a plurality of articles, wherein the indexing comprises preparing a plurality of pre-existing embeddings corresponding to the plurality of articles using at least one embedding model, and saving the plurality of pre-existing embeddings in a vector database.

In embodiments, the method includes receiving natural language-based input at a user device from the user;

In embodiments, the method includes pre-processing the natural language-based input by evaluating the natural language-based input for pre-defined stop words and removing the pre-defined stop words from the natural language-based input if detected.

In embodiments, the method includes transforming the pre-processed input into at least one current embedding using the embedding models.

In embodiments, the method includes computing at least one similarity score for the at least one current embedding and the pre-existing embeddings corresponding to the articles in the vector database; ranking the articles based on similarity score.

In embodiments, the method includes adjusting the ranking of the articles based on the natural language-based input from the user device; retrieving a selected plurality of articles based on the adjusted ranking of the articles; creating a prompt for sending to a text generation model, wherein the creating comprises applying at least one static system-based rule and at least one dynamic customer-based rule.

In embodiments, the method includes sending to the text generation model the prompt and the selected plurality of articles or selected portions or sections of articles, and requesting from the text generation model a summary of the selected plurality of articles based on the prompt and the selected plurality of articles; and sending the summary to the user. In embodiments, a portion or section of each of the selected articles is sent to the text generation model.

In embodiments, the at least one current embedding comprises a plurality of current embeddings, and wherein the method further comprises computing an individual score for each current embedding.

In embodiments, the method further comprises averaging the individual scores to obtain the similarity score for each pre-existing article.

In embodiments, the method further comprises ranking the articles based on the similarity score.

In embodiments, the pre-processing further comprises evaluating the input for generic words and translating the generic words into platform words, optionally using a lookup table.

In embodiments, the pre-processing comprises determining whether the input is a question based on evaluating the question for symbols, punctuation, and keywords.

In embodiments, the pre-processing further comprises evaluating whether input is an answerable question based on whether the question contains general inquiry information and customer specific information.

In embodiments, the method further comprises performing one or more of the steps of transforming, computing, selecting, creating, and requesting for different users in parallel using web server replicas.

In embodiments, the at least one static system-based rule is selected from the group comprising: to require the text generation model to limit responses to content contained in the articles; to follow good user experience (UX) writing principles to make answers digestible and empathetic to average person; and to require the response to be a valid Markdown (e.g., uses #for header or larger text) such that the response can be presented in a nicely-formatted way.

In embodiments, a dynamic user-based rule comprises evaluating the profile characteristics of the user, and adjusting the prompt based on the user profile characteristics. For embodiments, if the user is not confirmed as a paid account, the backend server creates a prompt limiting the summary to a redacted version and optionally, states the user is prohibited from the complete summary, and further optionally, displays an offer to the user for a paid account.

In embodiments, the adjusting the ranking of the selected articles is based on literal and contextual information contained in the natural language-based input. For example, if the question is directed towards email, down weight articles about SMS and vice versa.

In embodiments, the method further comprises adjusting the ranking of the selected articles based on detected behavior.

In embodiments, the detected behavior corresponds to a flow-triggered event by sub-users. For example, in flows, triggered actions arise from sub-user events such as an abandoned cart, and a message is automatically sent to the sub-user after some period of time from the event that the sub-user may have forgotten the item. In such case the rankings of the selected articles are adjusted for the user to inform the user on how to improve flows.

In embodiments, the detected behavior corresponds to electronic input sending success. For example, in campaigns, emails sent to sub-users bounce back or are classified as SPAM some percent of the sends. In such case the rankings of the selected articles are adjusted for the user to inform the user on how to improve deliverability.

In embodiments, the method further comprises collecting and saving feedback from the user regarding the quality of the summary for the corresponding input and prompt. For example, an emoji (thumbs up/down) or other indicia can be presented to the user to select or rate the summary.

In embodiments, the creating the prompt is based on the feedback.

In embodiments, the method further comprises detecting behavior characteristics of the user in real time.

In embodiments, the method further comprises presenting the user candidate suggestions for the pre-processed input based on the behavior characteristics of the user.

In embodiments, the method further comprises building a user question support database based on recording the user behavior and pre-processed input for each user, and presenting to the user the candidate suggestions from the database based on the user behavior and information associated with the recorded user behavior. Exemplary behavior and information associated with the recorded user behavior can include location on website (registration page, email summary generation page, etc.), keywords in question, and similar needs (e.g., registration, building campaign, building flow, etc.). Over time, these questions will get more and more relevant as a larger set of questions from users is collected, and as more feedback is obtained for the questions.

In embodiments, the indexing comprises chunking documents into at least one size of chunk, wherein each chunk corresponds to one of the pre-existing embeddings.

In embodiments, the indexing is performed on a backend server periodically, and in some embodiments, at least daily, or at least hourly.

In embodiments, the at least one size of chunk comprises at least two sizes. For example, in embodiments, a retriever such as Langchain's Parent Document Retriever is implemented where the articles are chunked up but keep a reference to the "parent" (the whole article or a section of the article) so the whole correct article can be recalled from the chunks.

In embodiments, a system for automatically providing dynamic content support to a user comprises: at least one trained transformer model for transforming content into embeddings; a vector database comprising articles, and pre-existing embeddings corresponding to articles generated by the transformer model, and operable to compute a similarity score between a current embedding and each of the pre-existing embeddings; and at least one network or web server.

In embodiments, the at least one network or web server is programmed and operable to: receive natural language user input from a user device; pre-process the user input into a pre-processed input, wherein pre-processing comprises removing stop words.

The at least one network or web server is further programmed and operable to generate, using the at least one transformer model, at least one current embedding from the pre-processed input; send the current embedding to the vector database to identify a plurality of selected documents based on a similarity score; rank the plurality of selected documents based on the similarity score; reorder the ranked plurality of selected documents based on the user input; retrieve the reordered plurality of selected documents; prepare a prompt command for a text generation model based on applying at least one static system-based rule and at least one dynamic customer-based rule; prompt the text generation model for a summary by sending to the text generation model the reordered plurality of selected documents and the prompt command; and send the summary to the user.

In embodiments, the system further comprises a load balancer module programmed and operable to distribute the raw input (namely, the natural language input) amongst the at least one network or web server.

In embodiments, the system further comprises a query content model programmed and operable to pre-process the natural language user input.

In embodiments, a non-transitory computer-readable medium storing instructions that, when executed by one or more computer processors of a computing platform, cause the computing platform operable to: index a plurality of articles to form pre-existing embeddings corresponding to articles; receive natural language user input; and pre-process the user input into a pre-processed input, wherein the pre-processing comprises removing stop words.

In embodiments, the operations are further operable to: transform the pre-processed input into at least one current embedding; send the current embedding to the vector database to identify a plurality of selected documents based on a similarity score; rank the plurality of selected documents based on the similarity score; reorder the ranked plurality of selected documents based on the user input; retrieve the reordered plurality of selected documents; prepare a prompt command for a text generation model based on applying at least one static system-based rule and at least one dynamic customer-based rule; prompt the text generation model for a summary of the selected documents by sending to the text generation model the reordered plurality of selected documents and the prompt command; and send the summary to the user.

Embodiments of the invention provide a number of advantages to users. For example, embodiments of the invention allow users of a network-based application to self-serve answers to their questions. The user asks a question in natural language, and the system retrieves the most relevant resources on the application (namely, the product) and answers the question with specific information from those resources in a few sentences, in addition to providing links to the resources for the user to further investigate.

In embodiments, the content is dynamically based on not only the user's question, but also characteristics and behaviors of the user, and in some embodiments, behaviors of sub-users to the user.

Other aspects and advantages of the described embodiments will become apparent from the following detailed description, taken in conjunction with the accompanying drawings, illustrating by way of example the principles of the described embodiments.

DETAILED DESCRIPTION

Figure 1:
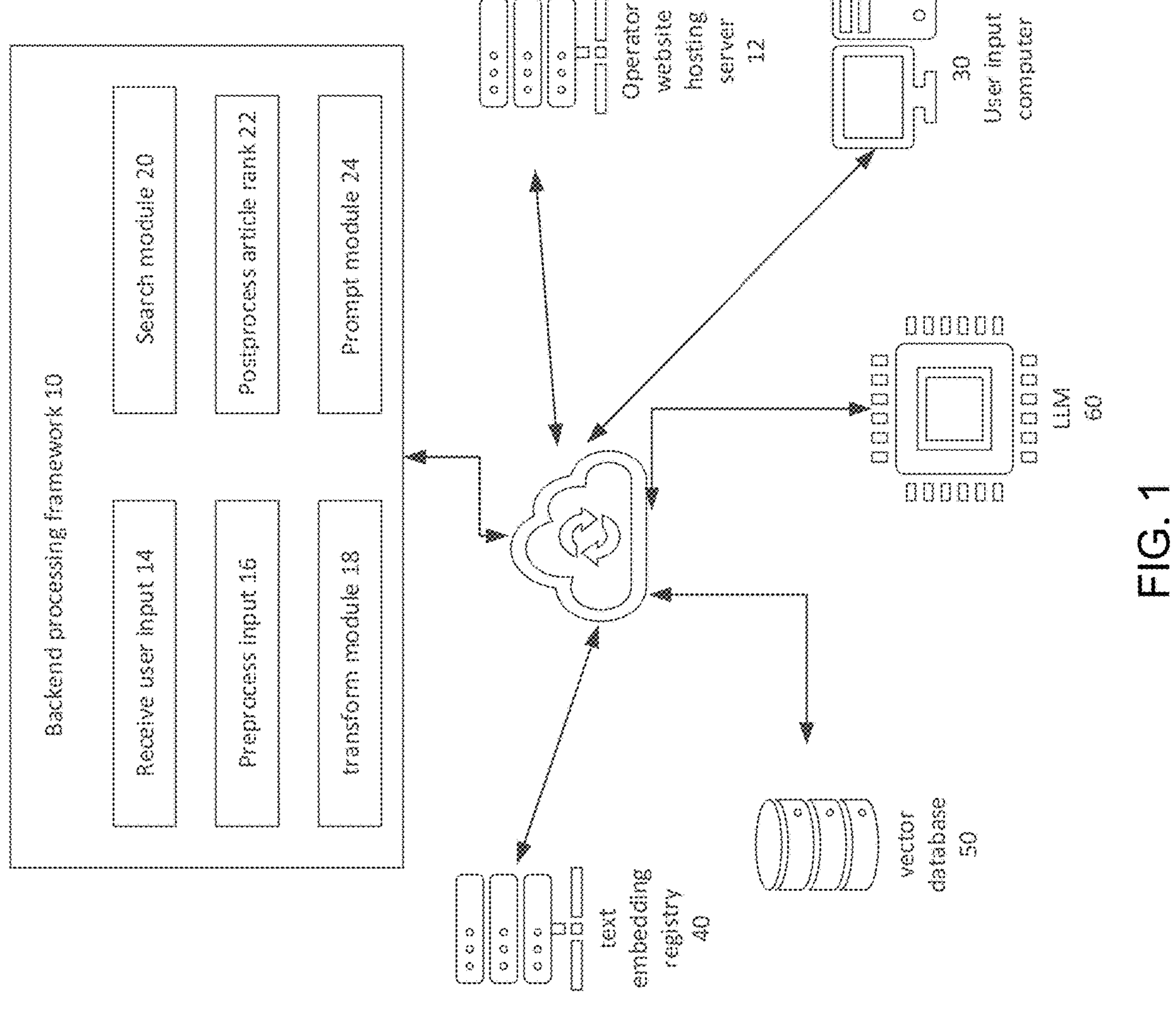
FIG. 1 shows a system for automatically providing dynamic content support to a user, according to an embodiment.

Before the present invention is described in greater detail, it is to be understood that this invention is not limited to particular embodiments described, and as such can, of course, vary. It is also to be understood that the terminology used herein is for the purpose of describing particular embodiments only, and is not intended to be limiting, since the scope of the present invention will be limited only by the appended claims. Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges can independently be included in the smaller ranges and are also encompassed within the invention, subject to any specifically excluded limit in the stated range. Where the stated range includes one or both of the limits, ranges excluding either or both of those included limits are also included in the invention. Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described. It is noted that, as used herein and in the appended claims, the singular forms "a", "an", and "the" include plural referents unless the context clearly dictates otherwise. It is further noted that the claims can be drafted to exclude any optional element. As such, this statement is intended to serve as antecedent basis for use of such exclusive terminology as "solely," "only" and the like in connection with the recitation of claim elements, or use of a "negative" limitation. As will be apparent to those of skill in the art upon reading this disclosure, each of the individual embodiments described and illustrated herein has discrete components and features which can be readily separated from or combined with the features of any of the other several embodiments without departing from the scope or spirit of the present invention. Any recited method can be carried out in the order of events recited or in any other order that is logically possible. All existing subject matter mentioned herein (e.g., publications, patents, patent applications and hardware) is incorporated by reference herein in its entirety except insofar as the subject matter may conflict with that of the present invention (in which case what is present herein shall prevail).

The embodiments described herein include methods, apparatuses, and systems for automatically providing dynamic content support to a user in a network-based application in response to the user's question. Embodiments of the invention provide a number of advantages to users. For example, embodiments of the invention allow users of a network-based application to self-serve answers to their questions. The user asks a question in natural language, and the system automatically retrieves the most relevant resources (e.g., documents) on the application and answers the question with specific information from those resources in a brief summary, and optionally, provides links to the resources for the user to further investigate.

With reference to FIG. 1, a system is shown for automatically providing dynamic content support to a user, according to an embodiment. The system includes a backend processing framework 10. The backend processing framework may vary widely. Examples of a backend processing framework include, without limitation, server(s), virtual server(s), and virtual machine(s). In embodiments, one or more steps are performed by a fleet of virtual machines.

For embodiments, the backend server 10 is operable to execute or run several modules including receiving user input 14, preprocess input 16, transform module 18, search module 20, postprocess article rank 22, and prompt module 24, each of which is discussed herein.

Receive User Input (Raw Question)

For an embodiment, the backend server 10 is operable to receive user input 14 from a user server 12. For an embodiment, the user server 12 manages a website of the user. It is to be understood that the term "user" is being used liberally. That is, the user may include any type of business owner. For example, a user can include, without limitation, an entrepreneur, a marketing professional, a doctor, a restaurant owner, etc. The user may manage the website server 12 via a UI of the server. In an embodiment, the user manages the website server 12 via a remote input computer 30.

For an embodiment, the input includes a text input. For an embodiment, the text input is limited to a set number of characters. Typically, the input is a question from the user requesting a solution. For example, a question may take the form of "How do I create a campaign?"

Preprocess Input (Rephrase Question)

For an embodiment, the server 10 further includes a preprocess module 16 to prepare and evaluate the input for searching. If the input text, after being cleaned, is determined to be answerable based on application of various logic rules, the preprocessed text can be searched, discussed herein.

Transform Module (Create Current Embedding)

For an embodiment, the server 10 includes at least one transform module 18 or transformer. The transform module converts the preprocessed text to a vector or embedding for searching. Examples of suitable natural language processing or sentence transformers are available from a text embedding registry 40 such as, e.g., Hugging Face (https://huggingface.co/). Additionally, the transformer module is not static and updated from time to time.

Search Module

For an embodiment, the server 10 further includes a search module 20 programmed and operable to search for pertinent articles from a library of articles based on the vector generated by the transformer 18. In embodiments, a vector database 50 includes a library of vectorized articles. In embodiments, the vector database 50 has a pre-existing embedding for each chunk of each article. The vector corresponding to the input text of the user (namely, the question) is evaluated for similarity with each of the articles in the vector database. A predetermined number of sections of articles is selected based on similarity score, discussed further herein. In embodiments, the predetermined number of sections of articles ranges from 2 to 40, and more typically 5 to 30, and preferably about 15-25.

Postprocess Article Rank

For an embodiment, the server 10 further includes a postprocess article rank module 22 programmed and operable to rank the articles based on, in addition to the similarity scores, logic rules including, for example, personalized preferences inferred from the user input, profile, or behaviors, discussed further herein.

Prompt Module

For an embodiment, the server 10 further includes a prompt module 24 programmed and operable to prepare a prompt for making a request to a text generation model such as a LLM (large language mode) 60. An example of a LLM is, without limitation, GPT-4 by OpenAI (San Francisco, California).

As described herein, in embodiments, the prompt module 24 prepares a custom prompt based on the retrieved articles, the input text and characteristics of the user, and system instructions.

Send Answer

The LLM 60 returns an answer to the prompt. In embodiments, the answer is in the form of a brief summary of, for example, 1-5 sentences. The summary is then sent to the host server, and displayed to the user via the user input computer 30.

Figure 2:
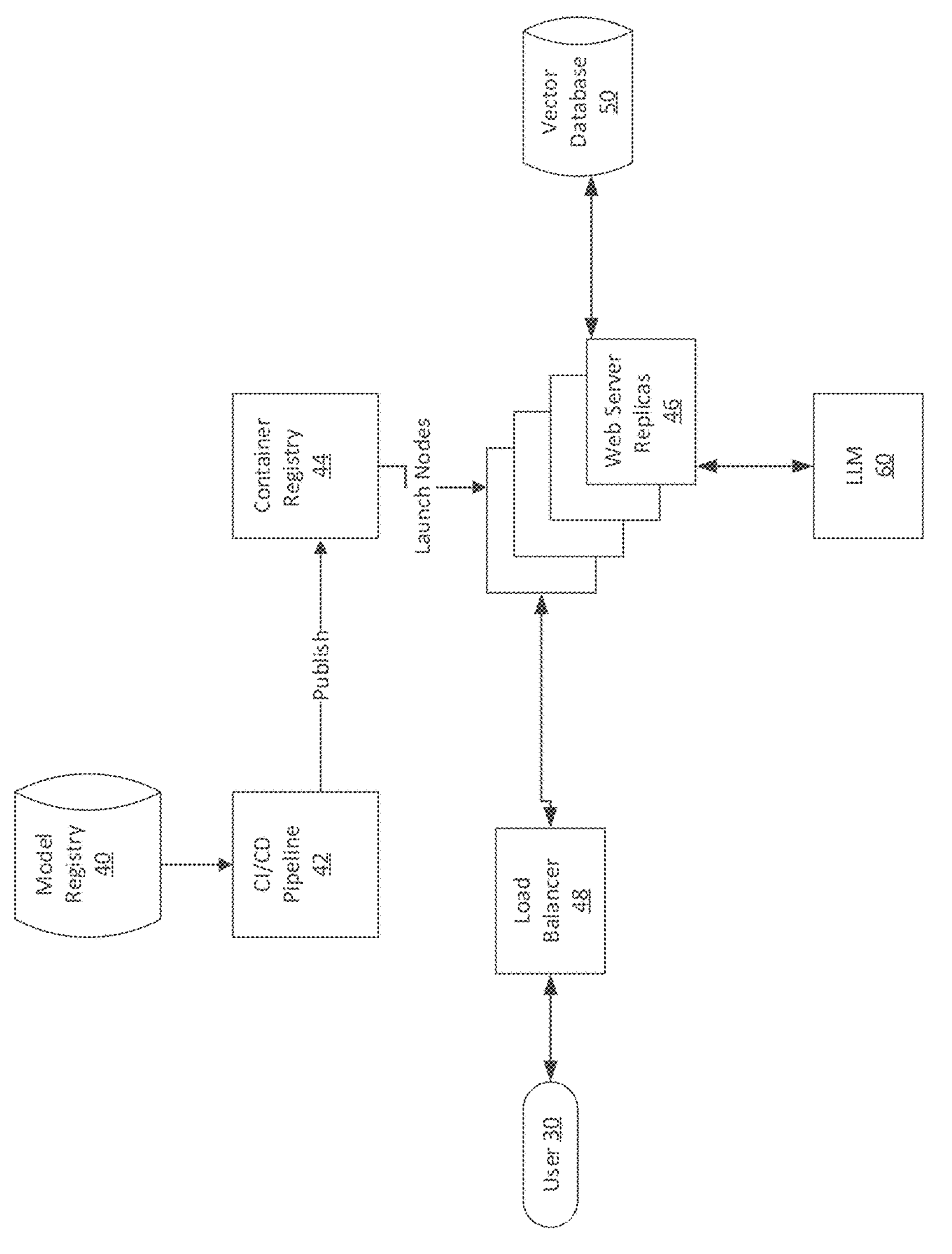
FIG. 2 shows a process for automatically providing dynamic content support to a user, according to an embodiment.

FIG. 2 shows a process for automatically providing dynamic content support to a user 30, according to another embodiment.

Model registry 40 comprises the text embedding models or transformers, described above. In embodiments, 2-4 transformers are deployed. The transformers are re-trained and re-evaluated from time to time.

When triggered by any changes in the source code of the application, the continuous integration/continuous deployment (CI/CD) pipeline 42 builds and compiles the code into a runnable application. Automated tests are run to ensure the code operates as expected.

The code is then deployed to container registry 44 for production use. Container registry 44 stores the code and all dependencies needed to independently run as an application on a web server 46 as an 'image'.

The web servers 46 access the container registry 44 and the load balancer 48 is operable to optimally distribute the pre-processed user input (namely, request) to one or more web server replicas 46. In embodiments, an orchestration tool deploys the multiple instances of the container image.

Each webserver replica 46 is operable to process multiple requests, communicate with the vector database 50 to retrieve the proper documents, and to prompt the LLM 60 to obtain a summary for the question, described further herein.

Figure 3:
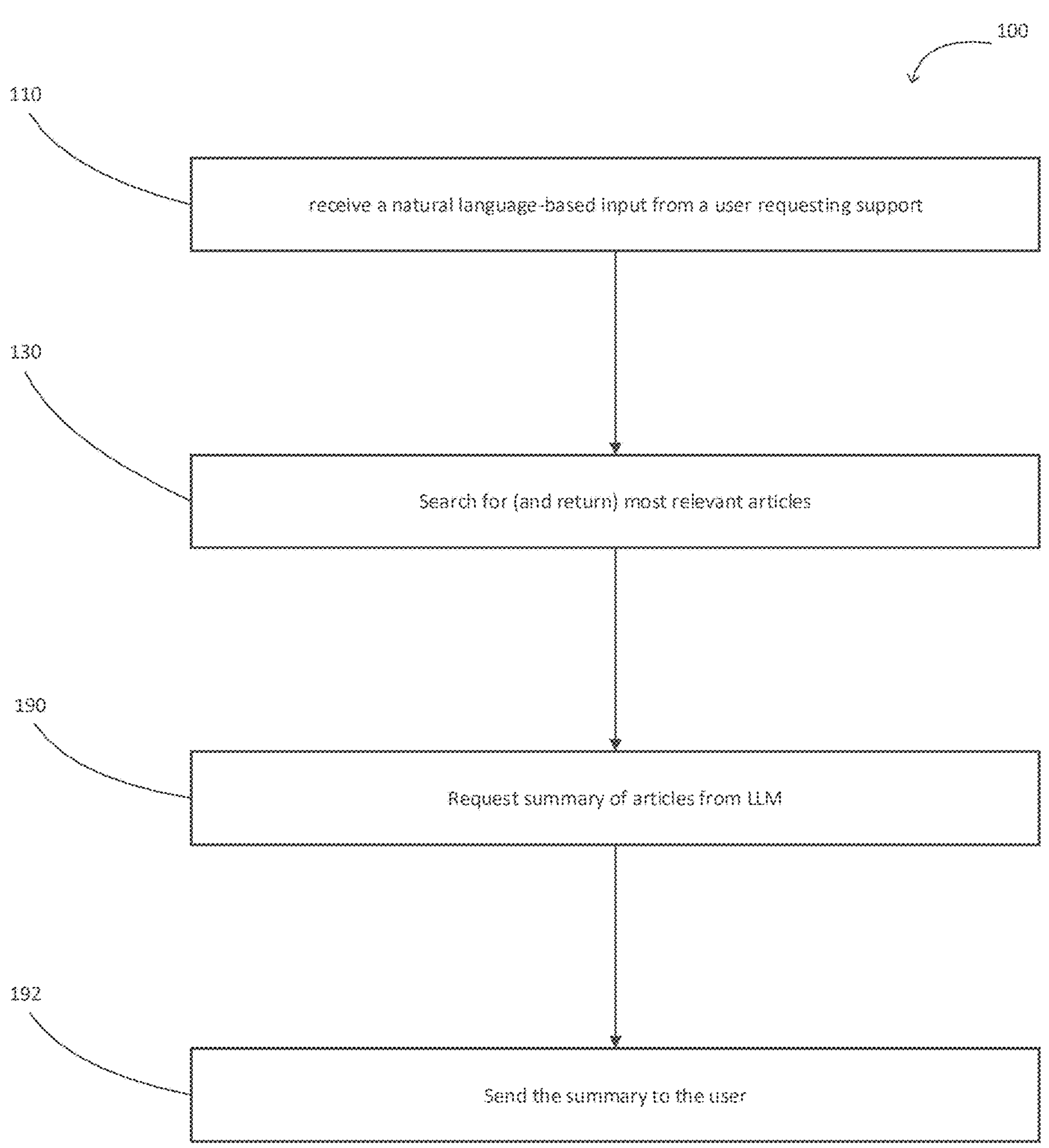
FIG. 3 is a flow chart of an overview of a method for automatically providing dynamic content support to a user, according to an embodiment.

FIG. 3 is a flow chart of an overview of a method 100 for automatically providing dynamic content support to a user, according to an embodiment.

Step 110 states to receive a natural language-based input from a user requesting support or help. This step can be performed via the user inputting a question in natural language to the computing device 30 described above. The backend server 10 is operable to receive the question and pre-process it prior to searching.

Step 130 states search for (and return) most relevant articles. This step is performed by comparing the pre-processed input to a set of articles in a vector database.

Step 190 states request summary of articles from LLM. In embodiments, a request or prompt is generated based on the retrieved articles from step 130, user question 130 and characteristics, and system rules. The system rules can include static limitations such as but not limited to limiting the responses to content contained in the articles; to follow good user experience (UX) writing principles to make answers digestible and empathetic to average person; and to require the response to be a valid Markdown (e.g., uses #for header or larger text) such that the response can be presented in a nicely-formatted way.

The LLM is operable to prepare a text summary based on the prompt.

Step 192 states to send the summary to the user. In embodiments, the summary is sent and displayed to the user on the user computing device 30 via the host server 12.

Figure 4:
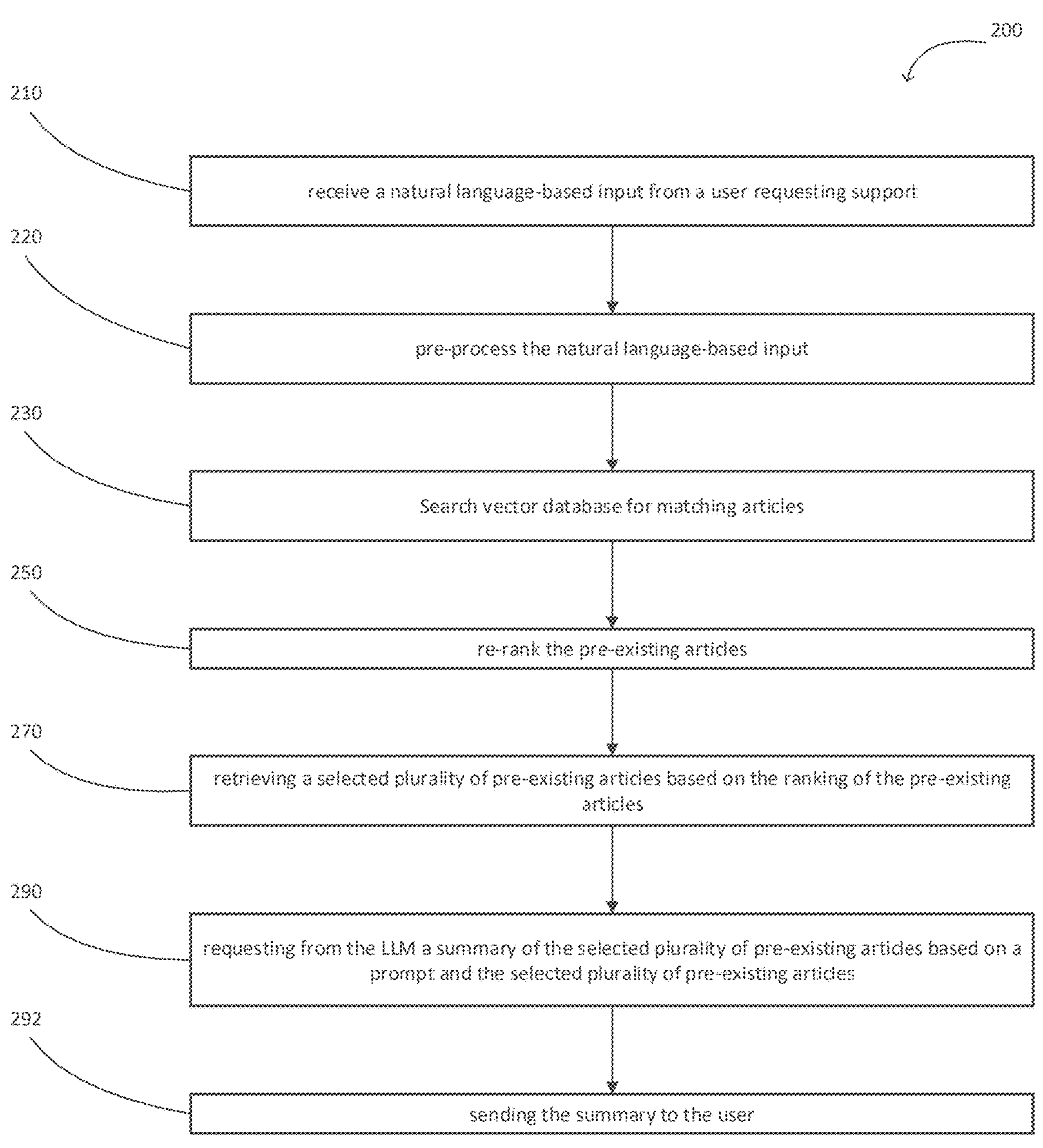
FIG. 4 is a flow chart of a more detailed method for automatically providing dynamic content support to a user, according to an embodiment.

FIG. 4 is a flow chart of a more detailed method for automatically providing dynamic content support to a user, according to another embodiment.

Step 210 states to receive a natural language-based input from a user requesting support or help. This step can be performed as described above in connection with FIG. 3.

Figure 5:
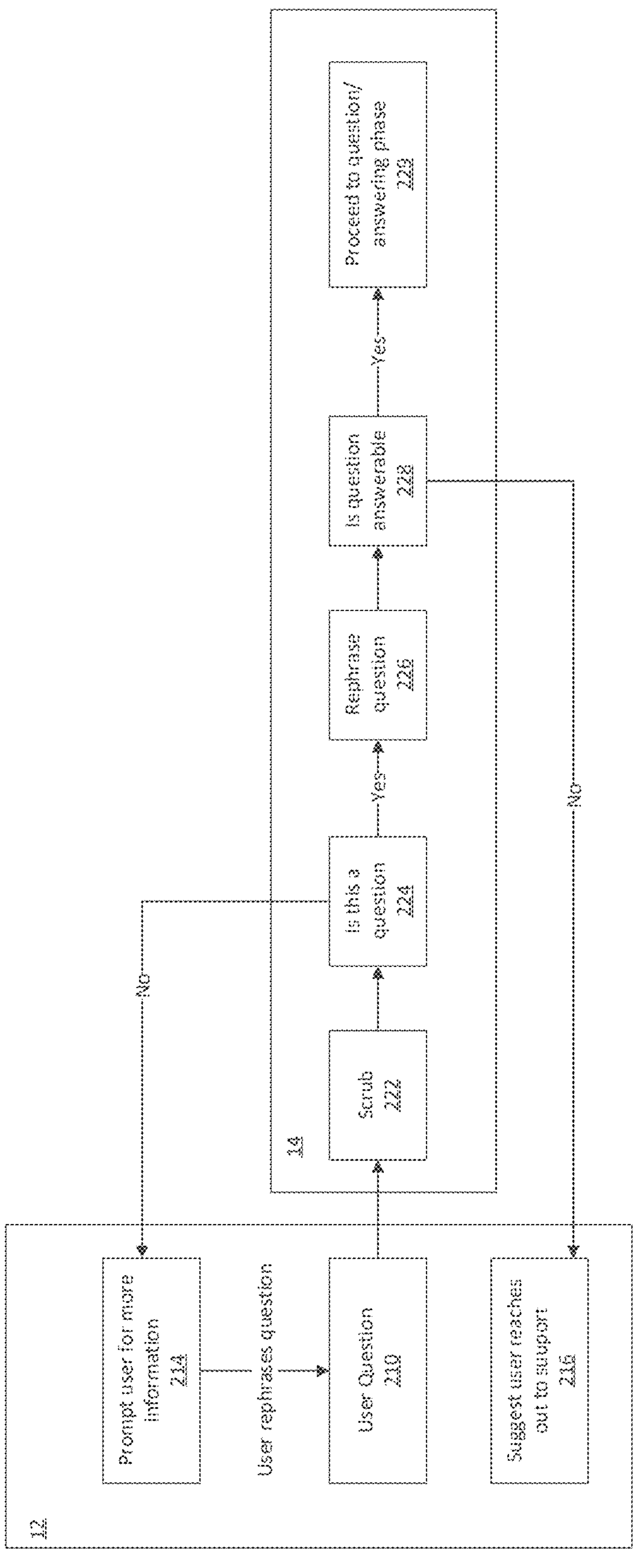
FIG. 5 is a flow chart showing a method for pre-processing user input, according to an embodiment.

Step 220 states to pre-process the natural language-based input. With reference to FIG. 5, in embodiments, the pre-processing can include multiple steps performed by module 14 of the backend server.

Step 222 states to scrub the initial text for predetermined common words which are used frequently in the articles. For example, the supporting company's name may be listed frequently in the articles but not relevant to the question. Removing these so-called 'stop' or 'hot' words reduces false-positive matches to the articles that are not relevant to the question.

Next, step 224 states to query whether the input is a question. In embodiments, the text is evaluated for whether it is a question or more-like a mere keyword search. In embodiments, if the text comprises solely one word, it is deemed a keyword search. In embodiments, the text is searched for question-type words such as, for example, "how", "what", etc. In embodiments, the text is evaluated for certain characters or punctuation such as a question mark.

In embodiments, the question is sent to the LLM for determination of whether it is a question or keyword search. For example, the text is sent to the LLM with a prompt "Is this a question or a keyword search?" The LLM returns an answer whether the text is a question or keyword search.

And, if the user input is not a question, the method returns to step 214 to request the user for more information and the preprocessing is repeated.

If the text is deemed a question, the method moves to step 226 to rephrase the question. In embodiments, step 226 is performed by replacing plain English words in the question with predefined words of art or consequence to better match the text (and concepts) used in the articles. For example, the phrase "split up my list of emails by XYZ factor" would be replaced with "segment my list based on XYZ". This step results in more relevant search results. The predefined set of words can be stored along with a table or transformation matrix for automatically replacing the plain English words with the corresponding word of art. Examples of words of art include, without limitation, segmentations, flows, campaigns, reviews, CDP, and forms.

Next, step 228 queries whether the question is deemed answerable. In embodiments, this step is performed by classifying the question and determining whether the question falls into a first category (e.g., a general question that could apply to any user) or a second category (e.g., a specific question that could only apply to the user). An example of a specific question is "Why did this particular email not send on Tuesday?" In embodiments, the question is sent to an LLM for evaluation of whether the question is answerable. "Is this question answerable without any information specific to the user's account? Or, could this question apply to any user? If the question is deemed unanswerable the method proceeds to step 216 to obtain customer support for specific inquiries.

If the question is determined to be answerable, the process proceeds to the next answering phase (step 229), described herein.

With reference again to FIG. 4, step 230 states search vector database for matching articles. In embodiments, this step is a semantic search. In embodiments, this step is performed by transforming the pre-processed text from step 220 into an embedding which is compared to the embeddings for the articles, or in some embodiments, compared to embeddings for chunks of text for each article in the vector database. In embodiments, the comparison is performed by computing a similarity score such as a cosine similarity score for each article. In embodiments, the articles can be ranked in descending order by how similar they are to the original query.

Step 250 states to re-rank the articles. In this post-processing step, in embodiments, the server applies various logic rules based on context or numerical properties of the user input query. The inventors have found that post-processing the document rankings based on domain knowledge improves the search results.

For embodiments, if the user input question mentions an integration like Company A but not one like Company B, the server upweights any articles about Company A and downweighs any articles about Company B, so the user sees more relevant information.

For embodiments, if the user has the integration enabled on their account (e.g., with Company C), even if they don't explicitly mention the integration Company C in the query, the server upweights any articles about Company C. For example, a user asking "How do I create a coupon in Shopify?" will return similar results to a user who has Shopify enabled on their account that asks "How do I create a coupon?"

Additionally, if a user input query has a certain length (e.g. a threshold number of words), a predefined first set of articles are upweighted. For example, if the user input query is short (e.g. one or two words), the server upweights any articles containing "Getting started with . . . " in their titles, as these articles tend to be more generic, higher-level summaries of a topic which are more likely relevant to a user who inputs a more generic search such as "campaigns".

In embodiments, the adjusting the ranking of the selected articles is based on detected behavior. For embodiments, the detected behavior corresponds to a flow-triggered event or electronic input sending success. In embodiments, the detected behavior corresponds to a flow-triggered event by sub-users. For example, in flows, triggered actions arise from sub-user events such as an abandoned cart, and a message is automatically sent to the sub-user after some period of time from the event that the sub-user may have forgotten the item. In such case the rankings of the selected articles on how to improve flows are upweighted.

In embodiments, the detected behavior corresponds to electronic input sending success. For example, in campaigns, emails sent to sub-users bounce back or are classified as SPAM some percent of the sends. In such case the rankings of the selected articles on how to improve deliverability are upweighted.

Step 270 states retrieving a plurality of articles based on the ranking of the articles. This step is performed by sending the selected articles from the vector database to the server 10.

Step 290 states requesting from the LLM (large language model) a summary of the selected plurality of articles. In embodiments, a request or prompt is generated based on the retrieved articles from step 270, user input question 210, and one or more system rules. The system rules can include static limitations such as but not limited to limiting the responses to content contained in the articles; to follow good user experience (UX) writing principles to make answers digestible and empathetic to average person; and to require the response to be a valid Markdown (e.g., uses #for header or larger text) such that the response can be presented in a nicely-formatted way.

Step 292 states to send the summary to the user. This step can be performed as described above in connection with FIG. 3.

Figure 6:
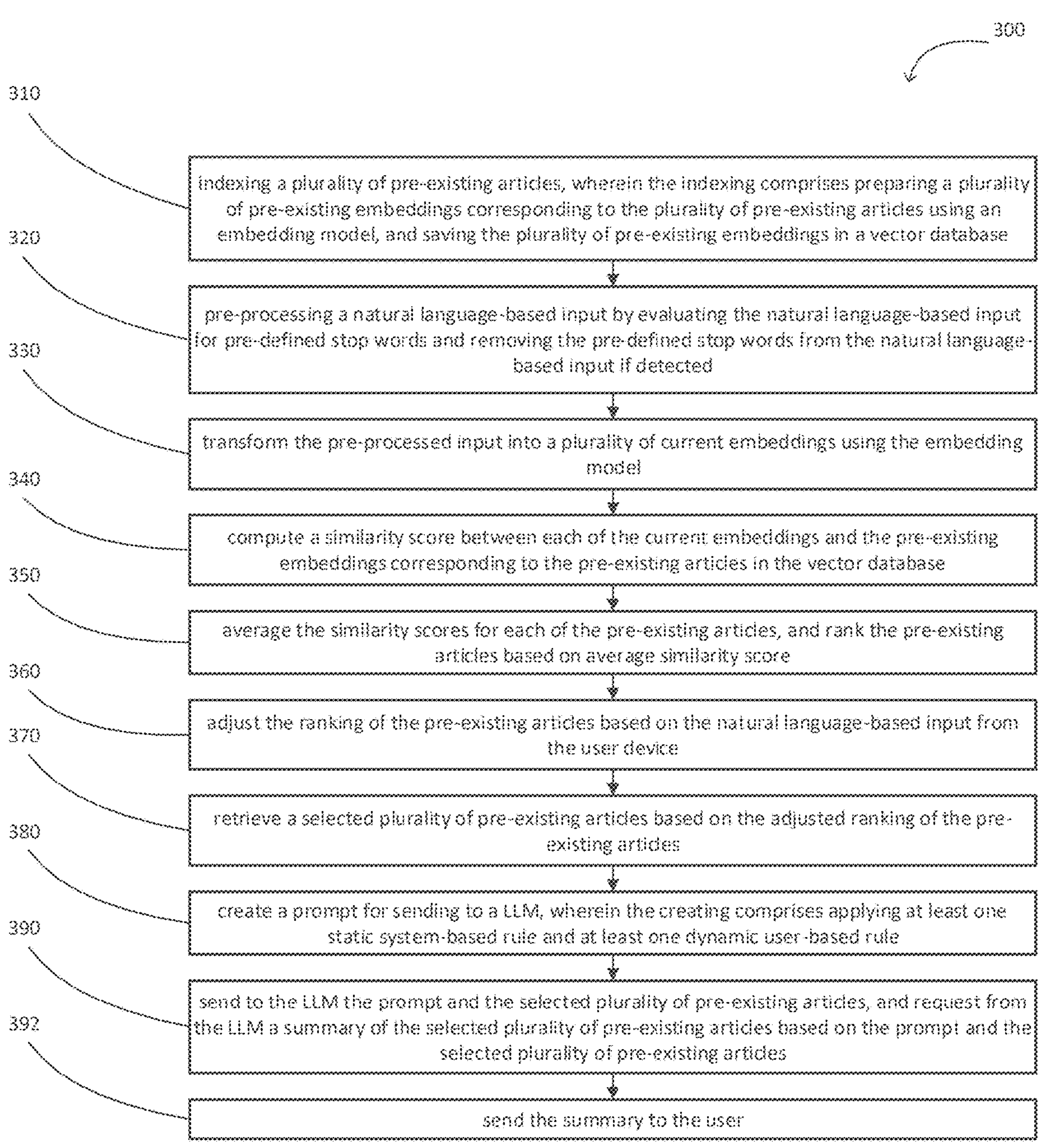
FIG. 6 is a flow chart of a more detailed method for automatically providing dynamic content support to a user, according to an embodiment.

FIG. 6 is a flow chart of a more detailed method for automatically providing dynamic content support to a user, according to another embodiment.

Step 310 states indexing a plurality of articles, wherein the indexing comprises preparing a plurality of pre-existing embeddings corresponding to the plurality of articles using an embedding model, and saving the plurality of pre-existing embeddings in the vector database.

In embodiments, the backend server or processing framework employs a sentence-embedding model to transform the text in the articles into number sequences in the form of a vector.

In embodiments, the indexing comprises chunking the articles up. In embodiments, the indexing comprises chunking documents into at least one size of chunk, wherein each chunk corresponds to one of the pre-existing embeddings, and optionally, wherein the indexing is performed on the backend server 10 periodically.

In embodiments, the indexing is performed at least hourly.

In embodiments, the at least one size of chunk comprises at least two sizes.

For embodiments, a retriever such as Langchain's Parent Document Retriever is implemented where the articles are chunked up and keep a reference to the "parent" (the whole article) so the whole correct article can be recalled from the chunks.

Step 320 states pre-processing a natural language-based input by evaluating the natural language-based input for pre-defined stop words and removing the pre-defined stop words from the natural language-based input if detected. This step may be performed as described above in connection with step 220 and FIGS. 4-5.

Figure 7:
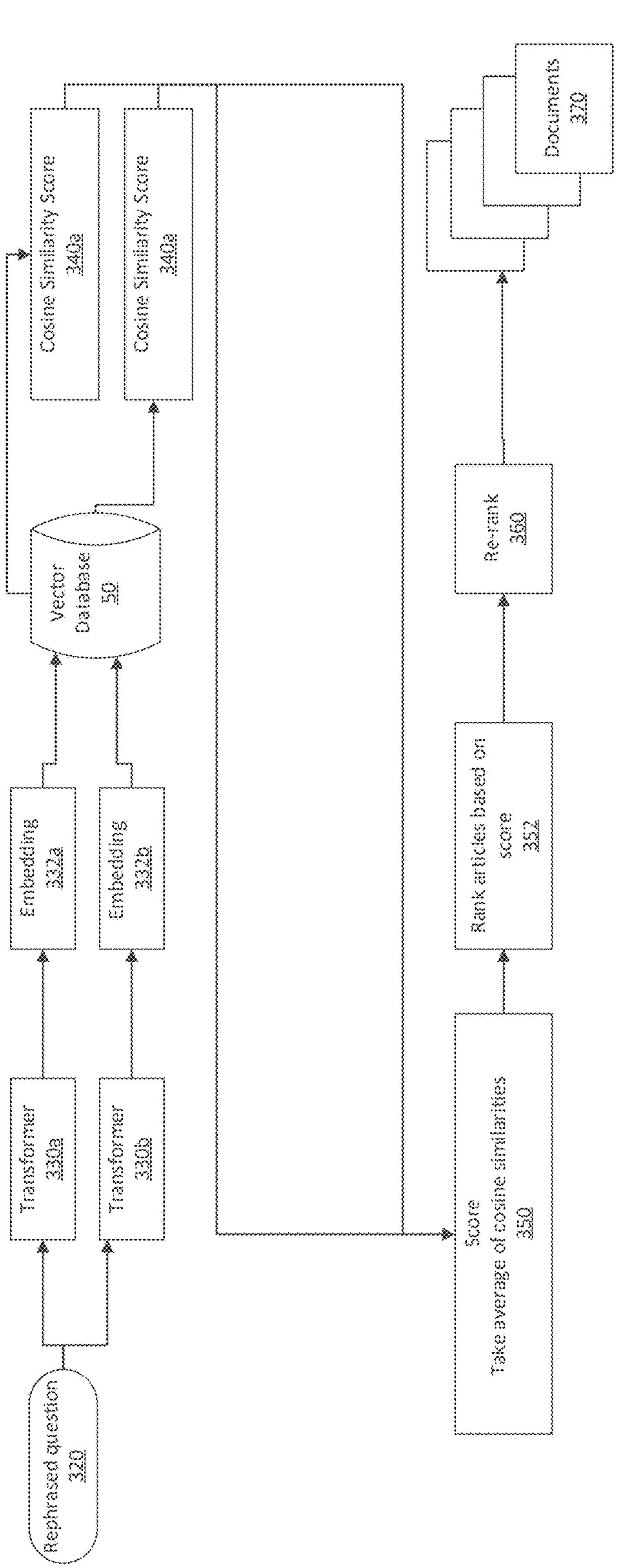
FIG. 7 is a flow chart showing a method for searching and retrieving documents, according to an embodiment.

Step 330 states to transform the pre-processed input into a plurality of current embeddings. With reference to FIG. 7, for embodiments, a plurality of transform models 330_a_, 330_b_ are provided and convert the preprocessed text (namely, the rephrased question) 320 into a plurality of vectors or embeddings 332_a_, 332_b_ for searching. Examples of suitable natural language processing or sentence transformers are available from a text embedding registry such as, e.g., Hugging Face (https://huggingface.co/). For embodiments, the transform models differ from one another in the corpora (and the length of the corpora) used to train the transformers. Additionally, the transformer models are not static and are updated from time to time.

Step 340 states to compute a similarity score between each of the current embeddings 332_a_, 332_b_ and the pre-existing embeddings corresponding to the articles in the vector database. This step may be performed by applying a wide range of similarity algorithms. For embodiments, the cosine similarity is computed for each article embedding for each current embedding 340_a_, 340_b_.

Step 350 states to average the similarity scores 340_a_, 340_b_ for each of the articles, and rank the articles based on average similarity score.

With reference to FIG. 7, step 352 states to rank the articles based on score. For embodiments, the articles are ranked in descending order from being most similar to the question.

Step 360 states to adjust the ranking of (or re-rank) the articles based on the natural language-based input from the user device. The inventors have found that post-processing the document rankings based on domain knowledge improves the search results. This step may be performed as described above in connection with step 250 of FIG. 4.

Step 370 states to retrieve the selected plurality of articles based on the adjusted ranking of the articles. As described herein, in embodiments, each pre-existing embedding contains a reference to the whole article (namely, the parent). Each section or portion (up to the whole) of the article is retrieved based on the reference to the parent.

Step 380 states to create a prompt for sending to a LLM, wherein the creating comprises applying at least one static system-based rule and at least one dynamic user-based rule.

Figure 8:
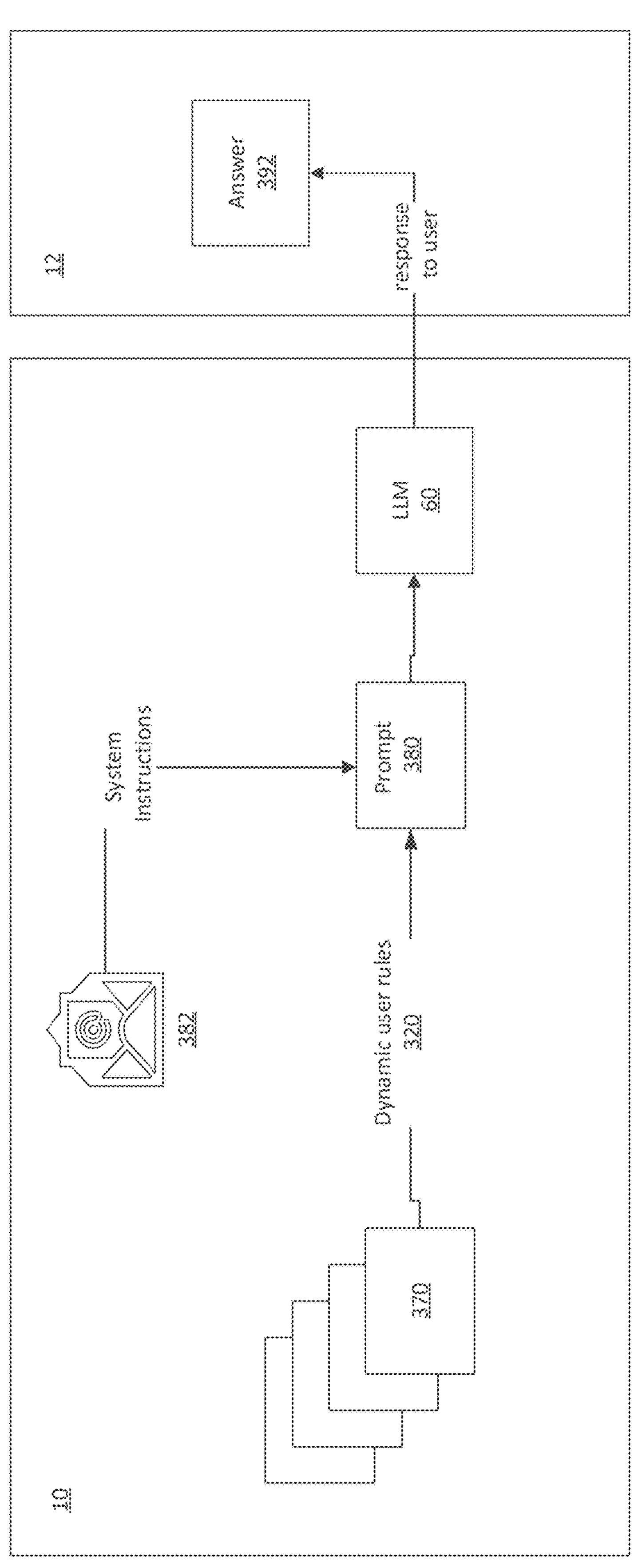
FIG. 8 is a flow chart showing a method for preparing a prompt for making a request to the LLM, according to an embodiment.

With reference to FIG. 8, in embodiments, a request or prompt 380 is generated based on several inputs including the retrieved articles from step 370, dynamic user-based rules applied to the input question 320, and one or more static system-type instructions 382.

The collection of retrieved articles or sections thereof is provided by step 370.

The user-based rules 320 can include dynamic limitations such as, but not limited to, user profile characteristics such as whether the user has a paid account. For embodiments, if the user is not confirmed as a paid account, the backend server creates a prompt limiting the summary to a redacted version and optionally, states the user is prohibited from the complete summary, and further optionally, displays an offer to the user for a paid account.

For embodiments, if the user is not confirmed as a paid account, the backend server creates a prompt stating, e.g., “This user is on a free account, so do not recommend they use any paid-only features” to help ensure they don’t get directed towards a feature they can’t use.

For embodiments, the dynamic user-based rule comprises evaluating the profile characteristics of the user, and adjusting the prompt based on the user profile characteristics.

The system-type rules 382 can include static limitations such as, but not limited to, (a) limiting the responses to content contained in the articles; (b) to follow good user experience (UX) writing principles to make answers digestible and empathetic to average person; and (c) to require the response to be a valid Markdown (e.g., uses #for header or larger text) such that the response can be presented in a nicely-formatted way.

Additionally, in embodiments, creating the prompt is based on user feedback. For embodiments, feedback is collected from a user’s review of the summary. For example, a user feedback review can be in the form of a thumbs up or down. The pre-processed input (or rephrased question), prompt, and review can be recorded to a reviews database. A prompt feedback model can be trained over time to predict prompts most likely to achieve favorable user reviews.

With reference again to FIG. 6, step 390 states to send to the LLM (large language model) the prompt and the selected plurality of articles, and request from the LLM a summary of the selected plurality of articles based on the prompt and the selected plurality of articles. This step may be performed as described above in connection with steps 190, 290 of FIGS. 3, 4 respectively.

Step 392 states to send the summary to the user. This step may be performed as described above in connection with steps 192, 292 of FIGS. 3, 4 respectively.

Alternative Embodiments

Tracking User Actions

For an embodiment, the server 10 displays candidate questions to the user on the computing device 30 via the host server 12. For at least some embodiments, the user actions are tracked. For embodiments, tracking of the user actions includes tracking the user selecting a displayed question of a plurality of displayed questions. Clicking the displayed question indicates an interest by the user in the selected question and indicates a level of value of the selected question. For an embodiment, tracking of the user includes tracking the user modifying the question, and submitting a final revised question. For an embodiment, tracking of the user includes identifying differences between the questions displayed to the user and the question(s) submitted. Modifying a selected question provides a level of value of the modified and submitted question.

For an embodiment, different tracked user actions suggest a different level of quality of each of the questions. Accordingly, different specific actions, and/or combinations of actions performed by the user on the displayed questions can yield a different ranking of the questions.

For an embodiment, a discriminator model is trained on historically tracked user actions on previously generated questions, wherein the historical users’ actions include selection, editing, and actual use of a question. For an embodiment, the trained historical model is equipped to assign a quality rating to new, previously unseen questions after the questions have been generated, allowing selection of the predicted top-performing questions to display to the user.

Post Processing

Some embodiments can include post-processing the summary. For an embodiment, the post-process includes fixing a summary that includes an identified issue. For example, it is undesirable for a summary to include text in which text further down in the summary is larger than text higher up in the summary. The post-processing would manipulate the text of the summary to ensure that no text in the summary is larger than a header of the summary that occurs before the text of the summary.

For an embodiment, the post-processing includes fixing issues in which a clear and unambiguous fix can be applied. For an embodiment, if a fix does not exist, then the summary with the issue can be flagged or excluded from being sent to the user, in which case, the user can be asked to rephrase the question.

Tracking Sub-Users

At least some embodiments include monitoring and tracking, by the server, behavior of sub-users (i.e., customers of the user) and basing the summaries on the behavior of the sub-users.

For an embodiment, when the sub-user loads a webpage, user-tracking code is loaded in through a JavaScript bundle and utilized within the browser of the sub-user. For an embodiment, actions of the sub-user on the website of the user can be tracked. Further, a mobile device of a sub-user can be tracked to determine other possible actions of the sub-user. For an embodiment, forms that have been filled out and submitted to the website of the user can be monitored and tracked. For an embodiment, behavior of the sub-user’s internet browser or device (that would affect communication of a message or a sub-user's desired action) can be monitored or tracked. For an embodiment, navigation by the sub-user to a website or URL (universal resource locator) can be sensed, tracked, and monitored.

For an embodiment, content in the summary is dynamically updated based on actions or characteristics of the sub-user. In embodiments, monitoring of the sub-user actions can be used for optimizing the quality of the summary provided to the user. For example, if the sub-users are non-responsive to an email campaign prepared by the user, articles relating to email campaign sending are upweighted.

Further, for an embodiment, the mobile devices of the sub-users can be tracked and monitored. For an embodiment, the content of the summary is modified based on physical location and activities of the sub-users. The physical location and the activities can be sensed and/or identified based on locations and motion sensed by sensors of the mobile devices of the sub-users. Articles relating to a particular geographical area can be automatically upweighted based on the location of the sub-users to the extent there is a majority in a particular region. For example, summaries directed to discounts or regulations could be limited to the geographical region of the sub-user location.

Further, types of electronic channels of sub-users can be tracked for adjusting the content of the summary. For example, if a majority of the sub-users are non-responsive to SMS, articles relating to SMS are automatically upweighted.

Further, behaviors of sub-users can be tracked for adjusting the content of the summary. For example, if a majority of the sub-users are non-responsive during the evening hours or a holiday, articles relating to time of day and holidays are automatically upweighted.

As previously described, some of the described embodiments solve practical problems associated with automatically generating by a server or computing apparatus a highly relevant summary responsive to a user question.

Further, some of the described embodiments further solve practical problems associated with tuning the generation and other characteristics of the user input (namely, the question) or the LLM prompt based on preferences and actions of users and sub-users.

Although specific embodiments have been described and illustrated, the embodiments are not to be limited to the specific forms or arrangements of parts so described and illustrated. The described embodiments are to only be limited by the claims.

What is claimed:

1. A computer-implemented method for automatically providing dynamic content support to a user comprising:

indexing a plurality of articles, wherein the indexing comprises preparing a plurality of pre-existing embeddings corresponding to the plurality of articles or sections thereof using at least one embedding model, and saving the plurality of pre-existing embeddings in a vector database;

receiving a natural language-based input at a user device from the user;

pre-processing the natural language-based input by evaluating the natural language-based input for pre-defined stop words and removing the pre-defined stop words from the natural language-based input if detected;

transform the pre-processed input into at least one current embedding using the at least one embedding model;

compute a similarity score between the at least one current embedding and the pre-existing embeddings corresponding to the articles or sections thereof in the vector database;

ranking the pre-existing embeddings based on similarity scores;

adjusting the ranking of the pre-existing embeddings based on the natural language-based input from the user device;

retrieving a selected plurality of articles or sections thereof based on the adjusted ranking of the articles;

creating a prompt for sending to a text generation model, wherein the creating comprises applying at least one static system-based rule and at least one dynamic user-based rule;

sending to the text generation model the prompt and the selected plurality of articles or sections thereof, and requesting from the text generation model a summary of the selected plurality of articles or sections thereof based on the prompt and the selected plurality of articles or sections thereof; and sending the summary to the user.

2. The method of claim 1, wherein the at least one current embedding comprises a plurality of embeddings, and wherein the method further comprises computing an initial score for each current embedding for each pre-existing embedding.

3. The method of claim 2, further comprising, for each pre-existing embedding, averaging the initial scores to obtain the similarity score for the pre-existing embedding.

4. The method of claim 1, wherein the indexing comprises chunking the articles or sections thereof into at least one size of chunk.

5. The method of claim 1, wherein the pre-processing further comprises evaluating the input for generic words and mapping the generic words into platform words.

6. The method of claim 5, wherein the pre-processing comprises determining whether the input is a question based on evaluating the question for symbols and keywords.

7. The method of claim 6, wherein the pre-processing further comprises evaluating whether input is an answerable question based on whether the question contains general inquiry information and customer specific information.

8. The method of claim 1, further comprising performing one or more of the steps of transforming, computing, selecting, creating, and requesting for different users in parallel using web server replicas.

9. The method of claim 1, wherein the at least one static system-based rule is selected from the group comprising: (a) to require the text generation model to limit responses to content contained in the articles; (b) to follow good user experience writing principles to make answers digestible and empathetic to average person; and (c) to require the response to be a valid Markdown such that the response can be presented in a nicely-formatted way.

10. The method of claim 1, wherein the dynamic user-based rule comprises evaluating the profile characteristics of the user, and adjusting the prompt based on the user profile characteristics.

11. The method of claim 1, wherein the adjusting the ranking of the selected articles or sections thereof is based on literal and contextual information contained in the natural language-based input.

12. The method of claim 11, further comprising adjusting the ranking of the selected articles or sections thereof based on detected behavior.

13. The method of claim 12, wherein the detected behavior corresponds to a flow-triggered event or electronic input sending success.

14. The method of claim 1, wherein the creating the prompt is based on feedback, and wherein the feedback is collected from the user's review of the summary.

15. The method of claim 1, further comprising detecting behavior characteristics of the user in real time, and presenting the user candidate suggestions for the pre-processed input based on the behavior characteristics of the user.

16. The method of claim 15, further comprising building a user question support database based on recording the user behavior and pre-processed input for each user, and presenting the user the candidate suggestions from the database based on the user behavior and information associated with the recorded user behavior.

17. The method of claim 4, wherein each chunk corresponds to one of the pre-existing embeddings, and performing the indexing periodically and not less than daily.

18. A system for automatically providing dynamic content support to a user comprising:

a trained transformer model for transforming text into embeddings;

a vector database comprising articles, and pre-existing embeddings generated by the transformer model corresponding to the articles or sections thereof, and operable to compute a similarity score between a current embedding and each of the pre-existing embeddings;

at least one network or web server programmed and operable to:

receive natural language user input;

pre-process the user input into a pre-processed input, wherein pre-processing comprises removing predefined stop words;

generate, using the transformer model, at least one current embedding from the pre-processed input;

send the at least one current embedding to the vector database to identify a plurality of selected articles or sections thereof based on similarity scores;

rank the plurality of selected articles or sections thereof based on the similarity scores;

reorder the ranked plurality of selected articles or sections thereof based on the user input;

retrieve the reordered plurality of selected articles or sections thereof;

prepare a prompt command for a text generation model based on applying at least one static system-based rule and at least one dynamic customer-based rule;

prompt the text generation model for a summary by sending to the text generation model the reordered plurality of selected articles or sections thereof and the prompt command; and send the summary to the user.

19. The system of claim 18, further comprising a load balancer module programmed and operable to distribute the pre-processed input amongst the at least one network or web server.

20. A non-transitory computer-readable medium storing instructions that, when executed by one or more computer processors of a computing platform, cause the computing platform to perform the operations comprising:

index a plurality of articles to form pre-existing embeddings corresponding to the articles or sections thereof;

receive natural language user input;

pre-process the user input into a pre-processed input, wherein the pre-processing comprises removing stop words;

transform the pre-processed input into at least one current embedding;

send the at least one current embedding to the vector database to identify a plurality of selected articles or sections thereof based on similarity scores;

rank the plurality of selected articles or sections thereof based on the similarity scores;

reorder the ranked plurality of selected articles or sections thereof based on the user input;

retrieve the reordered plurality of selected articles or sections thereof;

prepare a prompt command for a text generation model based on applying at least one static system-based rule and at least one dynamic customer-based rule;

prompt the text generation model for a summary of the selected articles or sections thereof by sending to the text generation model the reordered plurality of selected articles or sections thereof and the prompt command; and send the summary to the user.

* * * * *